March 31, 1953  S. BERGSTEIN  2,632,918
METHOD AND MEANS FOR THE END COATING OF PACKAGES
Filed June 8, 1949  8 Sheets-Sheet 1
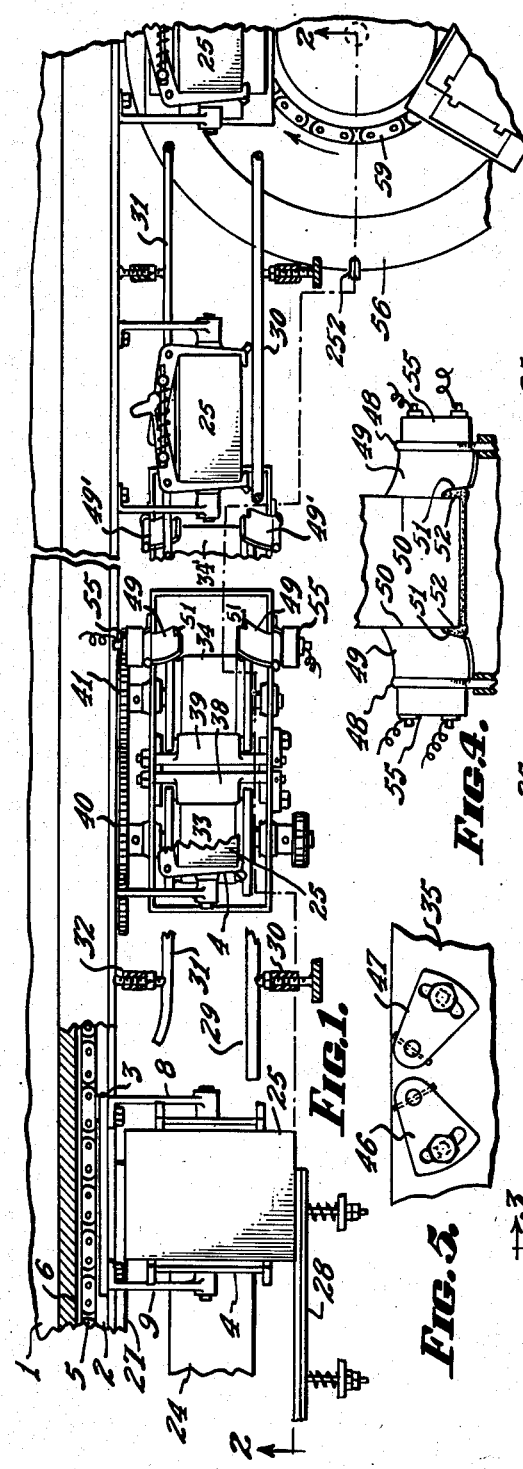
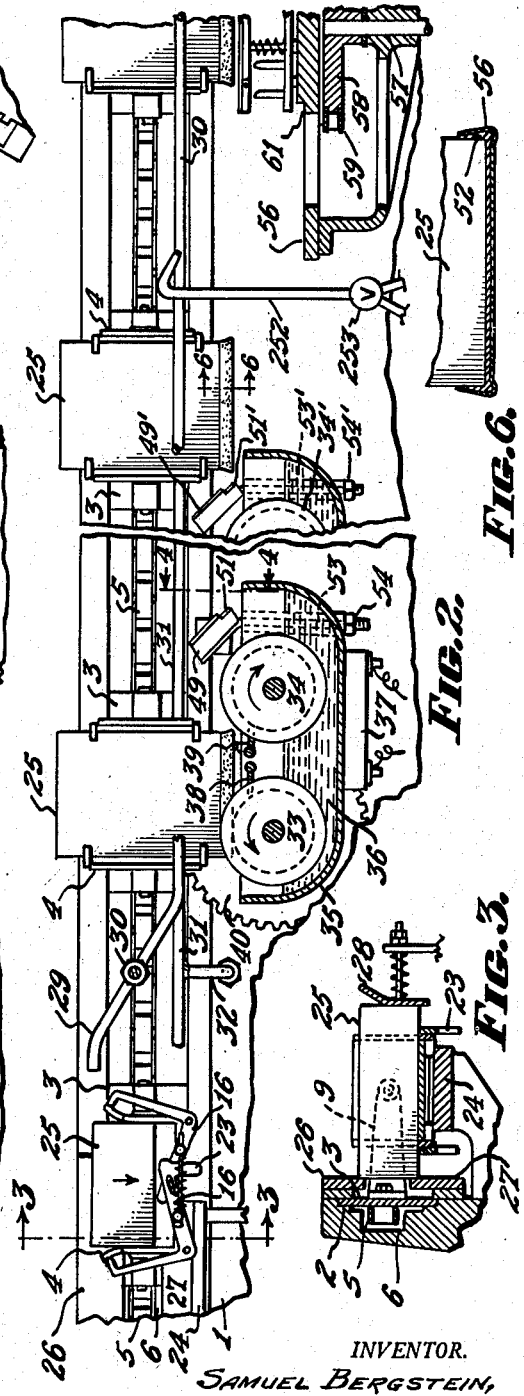
INVENTOR.
SAMUEL BERGSTEIN,
BY Allen & Allen
ATTORNEYS.

March 31, 1953     S. BERGSTEIN     2,632,918
METHOD AND MEANS FOR THE END COATING OF PACKAGES
Filed June 8, 1949     8 Sheets-Sheet 2
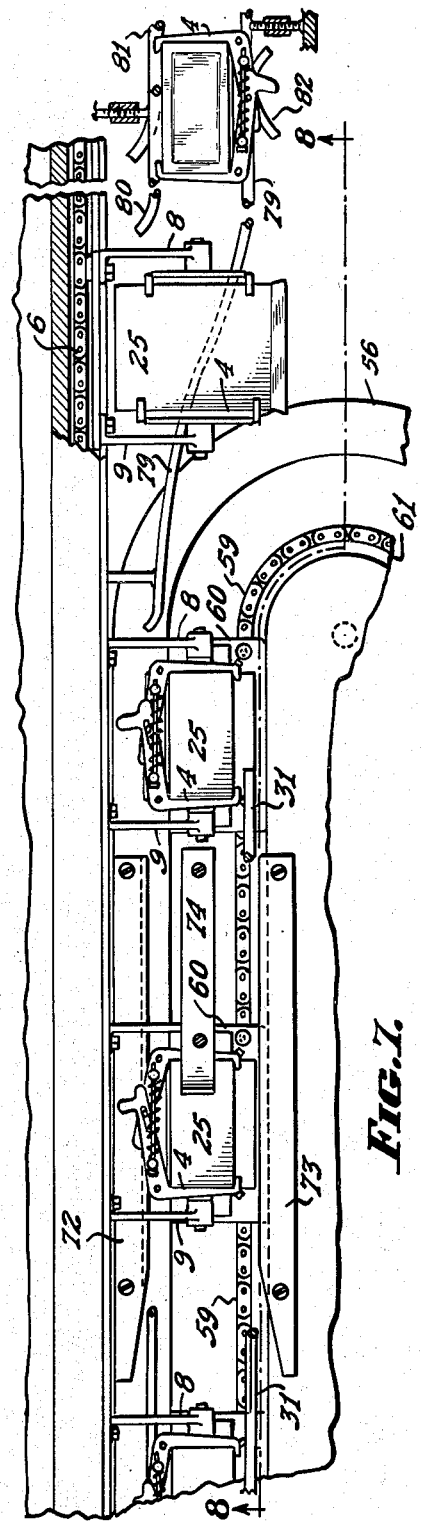
INVENTOR.
SAMUEL BERGSTEIN,
BY Allen & Allen
ATTORNEYS.

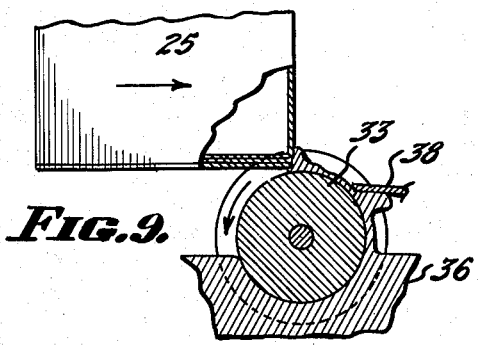
FIG.9.
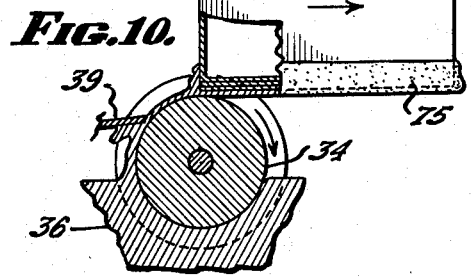
FIG.10.
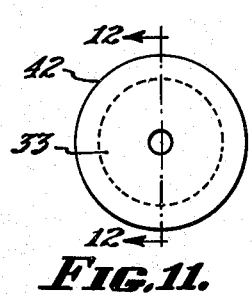
FIG.11.
FIG.12.
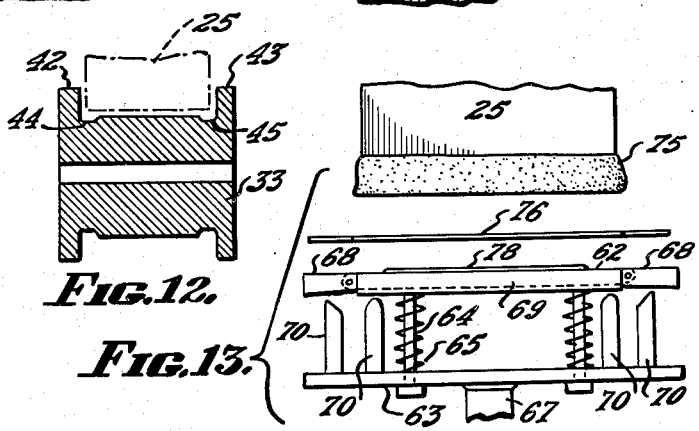
FIG.13.
FIG.15.
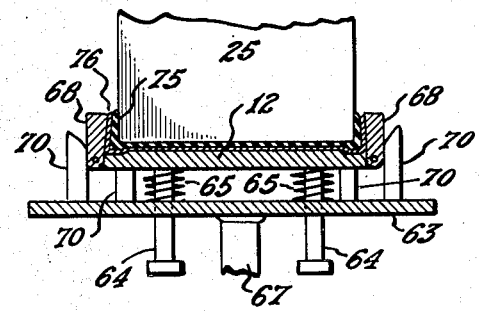
FIG.14.
FIG.16.
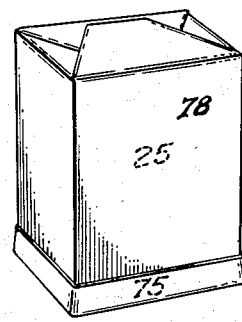
FIG.17.

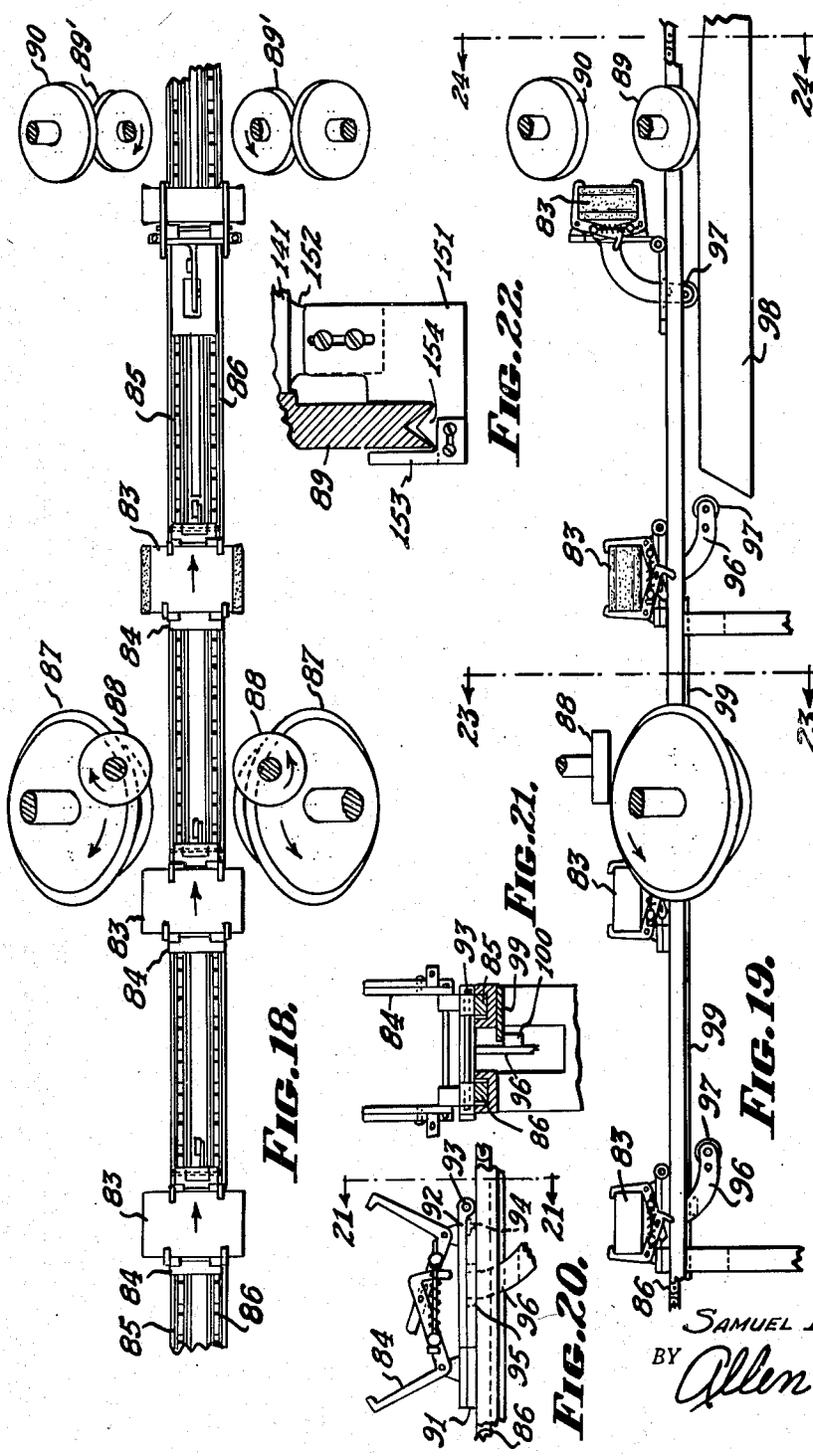

March 31, 1953 S. BERGSTEIN 2,632,918
METHOD AND MEANS FOR THE END COATING OF PACKAGES
Filed June 8, 1949 8 Sheets-Sheet 5
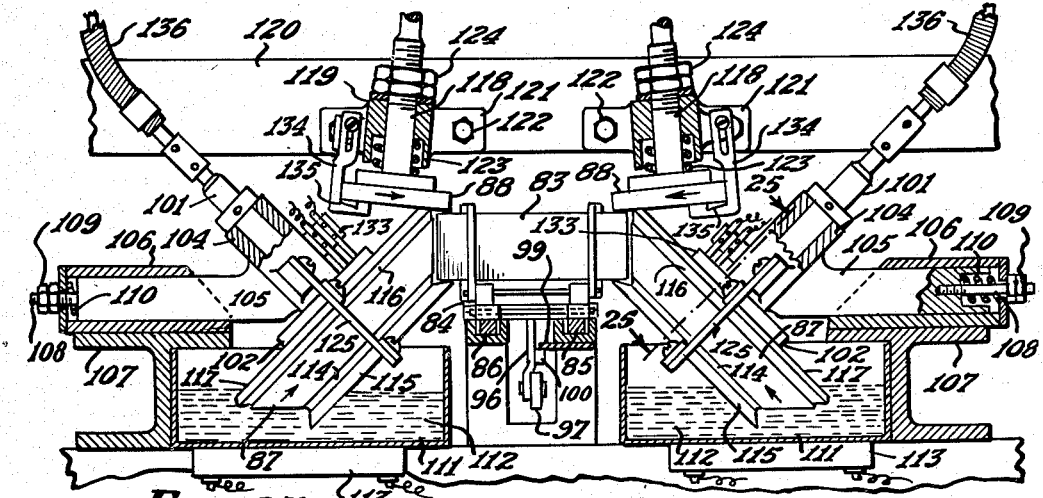
INVENTOR.
SAMUEL BERGSTEIN,
BY Allen & Allen
ATTORNEYS.

March 31, 1953   S. BERGSTEIN   2,632,918
METHOD AND MEANS FOR THE END COATING OF PACKAGES
Filed June 8, 1949   8 Sheets-Sheet 6
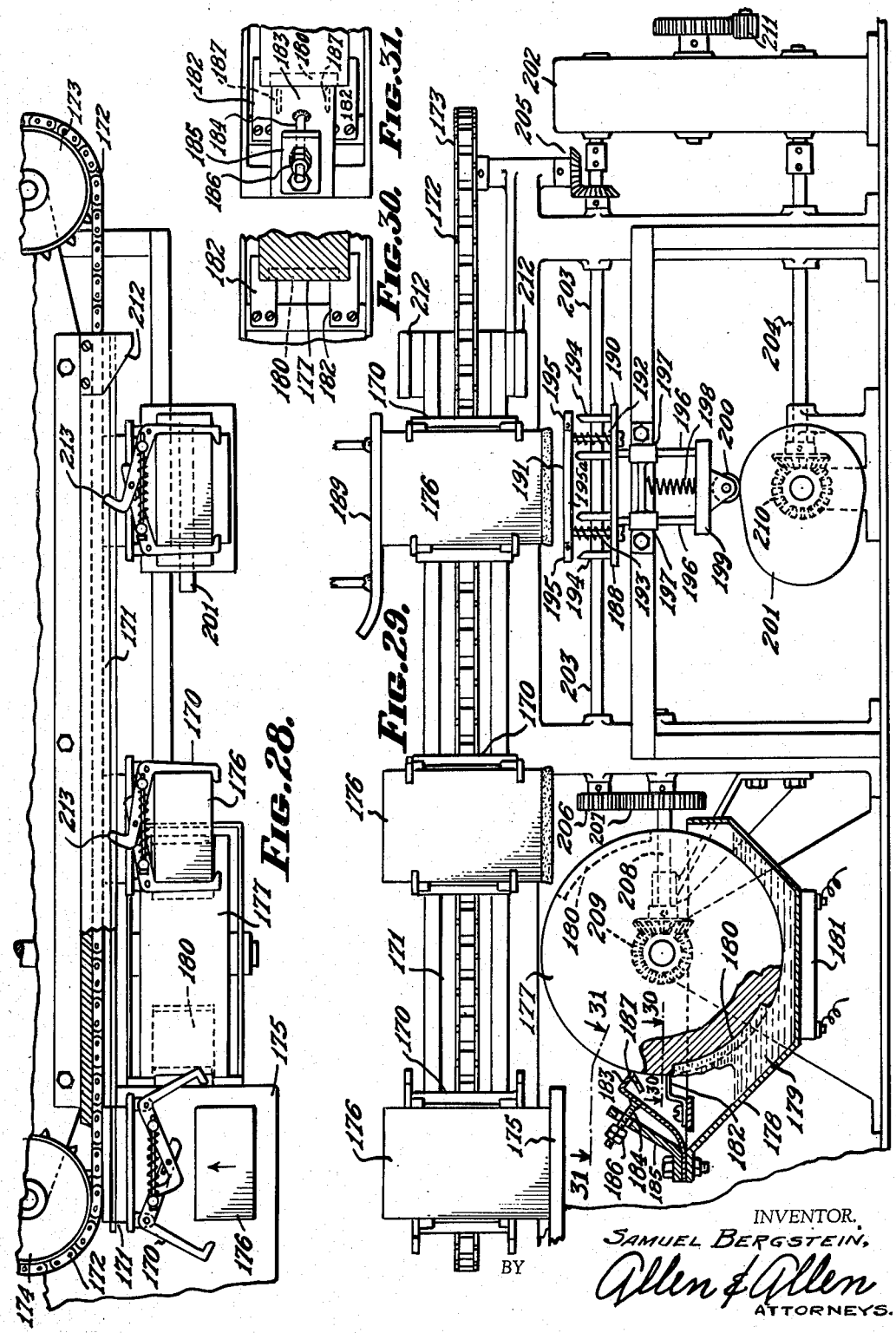
INVENTOR.
SAMUEL BERGSTEIN,
BY Allen & Allen
ATTORNEYS.

March 31, 1953     S. BERGSTEIN     2,632,918
METHOD AND MEANS FOR THE END COATING OF PACKAGES
Filed June 8, 1949     8 Sheets-Sheet 7

INVENTOR.
SAMUEL BERGSTEIN,
BY Allen & Allen
ATTORNEYS.

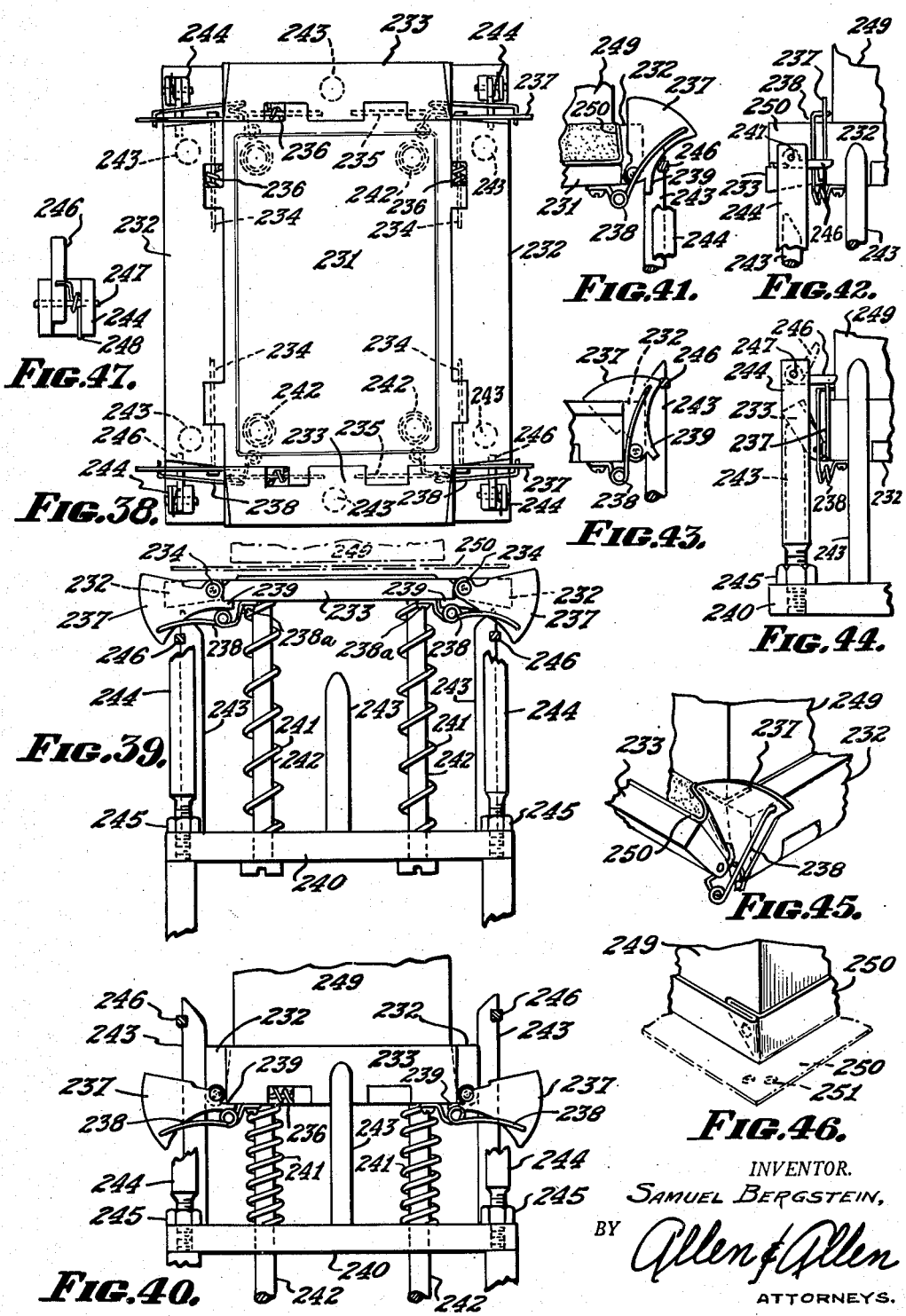

Patented Mar. 31, 1953

2,632,918

UNITED STATES PATENT OFFICE 2,632,918

METHOD AND MEANS FOR THE END COATING OF PACKAGES

Samuel Bergstein, Cincinnati, Ohio

Application June 8, 1949, Serial No. 97,790

23 Claims. (Cl. 18—1)

In my co-pending application, Serial No. 661,164, filed April 10, 1946, now Patent No. 2,548,251, and entitled Means and Methods for Securing the Effect of End Dipping in Gas-Tight Flexible Walled Packages, I have taught methods and means for molding a thermoplastic gas-tight coating substance about the ends of containers. In a preferred embodiment, a tubed paperboard container is covered as to its walls at least, with a gas-tight surrounding sleeve comprising preferably a membrane or a web resistant itself to the passage of gas, such as, for example, various non-fibrous films of commerce, and usually in combination with a coating of thermoplastic substance. The thermoplastic substance is then applied to one end of the carton, whereupon a molding device is employed to form the thermoplastic coating substance about the ends of the container and distribute it in the best positions for sealing and strength. A flexible cover sheet is placed on the molding device and folded about the end of the carton over the thermoplastic coating and molded therewith, remaining as a part of the completed carton, and among other functions, keeping the tacky, thermoplastic substance away from the molding means to prevent fouling thereof. The thermoplastic substance in a molten or heat softened condition may be applied first to the end of the carton as by dipping, and may be transferred into the molding device on the end of the carton. Alternatively, the cover sheet may be formed as a tray and the softened thermoplastic introduced into it prior to the association of the carton therewith. As another alternative, the thermoplastic substance may be pre-associated with the cover sheet and reactivated or softened prior to or during the association of the cover sheet and the thermoplastic with the carton. The present invention relates to improvements in means and methods of end coating packages, particularly the manner in which a thermoplastic substance is applied to the packages prior to the molding operation.

In the manner indicated I have found it possible to make packages which are completely moisture- and gas-tight and which comprise preferably a paperboard carton as the foundation and structural support, a sleeve element with a gas-tight longitudinal seam covering preferably the body walls of the carton, but in any event any peripheral series of walls and two end caps or closures which serve to close the ends of the sleeve in a gas tight fashion. The sleeve may be confined to the contiguous peripheral body walls of the carton, or it may be an all-over wrapping such as is produced by conventional wrapping machines, the ends of the package bearing folded portions of the wrapper, over which the end caps are formed.

In forming sealed packages of the character indicated, there are areas at the ends of the packages where a positive covering with a sufficient mass of thermoplastic substance is vital if gas-proofness is to be dependably obtained. These areas lie at the exposed free edges of the closure flaps and at the corners of the carton, where, in folding the flaps, they are not usually in perfect alignment and have protruding edges which must be completely covered. It has been found desirable to mold thicker areas of the thermoplastic at these areas of weakness. In my copending application referred to hereinabove, such thickened areas of thermoplastic are formed by configuring the forming members of the molding device to conform to the thickness of the coating desired. Thus a coating of thermoplastic substance applied to the end of the package by end dipping or by flooding the cover member, will be molded by displacement about the end of the package and contiguous portions of the package walls, the configurations in the forming members of the molding device causing substantial amounts of the thermoplastic to be displaced to the edges of the package where thickened areas are desired. While the method just described produces a satisfactory end cap, and is capable of automatic mechanization, a principal object of this invention is the provision of means and methods still better adapted to mechanization, as will hereinafter be more fully explained.

It is a principal object of this invention to provide mechanism capable of automatically capping one or both ends of a package, the mechanism being particularly suited for attachment to the end of the machine with which the package itself is formed, thereby providing continuous, automatic means capable of transforming a carton into a completely gas-tight capped package.

It is also an object of the invention to provide a means which may be incorporated in a packaging line to follow a wrapping machine of standard construction which will form the sleeve element which is part of my package combination.

It is an object of this invention to provide means and methods whereby end coating of packages can be achieved without the need of end dipping, which not only avoids the difficulties inherent in methods heretofore known, but provides economies in operation as well as in the quantities of coating substance required.

It is an object of my invention to provide a mechanized and coating technique applicable to both end closures of a package whereby they will be the same in shape, and tight against moisture, liquids and air.

It is an object of my invention to produce package of this character rapidly and inexpensively by means of mechanism capable of coating and molding the ends of packages in a continuous operation.

Another object of my invention resides in the provision of novel means for applying a thermoplastic coating to the packages being sealed, which means apply the exact desired amount of substance to the exact desired areas, and in providing molding means operating in timed relation with the preceding means whereby the coating of thermoplastic substance may be formed into a neat and attractive end cap firmly bonded to the package of which it forms a part.

Another object of my invention is to provide folding means for automatically interfolding corner portions of the cover or cap members applied over the coated ends of the package.

Another object of the invention is the provision of means for applying and distributing the sealing substance in end cap-structures, so as, in many instances, to eliminate the necessity of a molding step.

Other objects of my invention include the provision of improved mechanism for carrying on all the various steps involved in the end coating of packages as hereinabove described.

These and other objects of my invention which will be set forth hereinafter or will be apparent to one skilled in the art upon reading these specifications, I accomplish in those mechanisms, and by those methods of which I shall now describe exemplary embodiments.

Reference is made to the accompanying drawings wherein:

Figure 1 is a diagrammatical plan view with parts broken away of a mechanism with which my coating process may be carried on.

Figure 2 is a vertical sectional view taken along the irregular line 2—2 of Figure 1.

Figure 3 is a sectional view taken along line 3—3 of Figure 2.

Figure 4 is an enlarged sectional view taken along the line 4—4 of Figure 2.

Figure 5 is an enlarged sectional view taken along the line 5—5 of Figure 1.

Figure 6 is a partial sectional view taken along the line 6—6 of Figure 2 and illustrates a package having a double thickness end coating.

Figure 7 is a partial plan view with parts broken away of a continuation of the mechanism of Figure 1, illustrating the molding section of the device.

Figure 8 is a vertical sectional view taken along the line 8—8 of Figure 7.

Figures 9 and 10 are diagrammatical representations of the wheels for applying the coating substance to the packages.

Figure 11 is a detailed side elevation of one of the coating wheels.

Figure 12 is a sectional view taken along the line 12—12 of Figure 11.

Figure 13 is an exploded side elevational view showing a molding device, a cover member, and a package having a thermoplastic coating applied to its lower end.

Figure 14 is a longitudinal sectional view through the molding device with the parts illustrated in Figure 13 in molded position.

Figure 15 is a fragmentary sectional view through a carton molded as by means of the molding device of Figure 14.

Figure 16 is similar to Figure 15 but showing the molded end without a cover member.

Figure 17 is a perspective view of the package of Figure 15.

Figure 18 is a semi-diagrammatic plan view of an alternative mechanism which may be employed to carry on my coating process.

Figure 19 is a side elevational view of the mechanism of Figure 18.

Figure 20 is a fragmentary side elevation showing one of the cages of the mechanism of Figure 19 in open position.

Figure 21 is a sectional view taken along the line 21—21 of Figure 20.

Figure 22 is a fragmentary sectional view taken along the line 22—22 of Figure 24.

Figure 23 is a sectional view taken along the line 23—23 of Figure 19.

Figure 24 is a sectional view taken along the line 24—24 of Figure 19.

Figure 25 is an enlarged fragmentary view taken along line 25—25 of Figure 23.

Figure 26 is a partial perspective of a package as coated by the device of Figure 23.

Figure 27 is a partial perspective of a package after application of coating composition to the opposite edges, as by means of the device of Figure 24.

Figure 28 is a partial plan view with portions broken away of still another alternative mechanism for forming end capped packages.

Figure 29 is a front elevation with parts broken away of the device shown in Figure 28.

Figure 30 is an enlarged sectional view taken along the line 30—30 of Figure 29.

Figure 31 is an enlarged view taken along the line 31—31 of Figure 29.

Figure 38 is a plan view of a molding device incorporating means for folding corner portions of the cover member.

Figure 39 is a front elevational view with parts broken away illustrating the device of Figure 38.

Figure 40 is a view similar to Figure 39 but showing the molding device with the forming members closed.

Figure 41 is a fragmentary view showing an intermediate stage in the operation of the corner folding device.

Figure 42 is an elevation taken from the right side of Figure 41.

Figure 43 is similar to Figure 41 and shows the folding device in an advanced stage of operation.

Figure 44 is an elevation taken from the right side of Figure 43.

Figure 45 is a fragmentary perspective illustrating an intermediate stage in the corner folding of the cover member.

Figure 46 is also a partial perspective and shows the completed cover member. The unfolded position of the cover member is indicated in broken lines.

Figure 47 is a top view of the spring biased finger which activates the corner-folding pallet.

Figure 32:
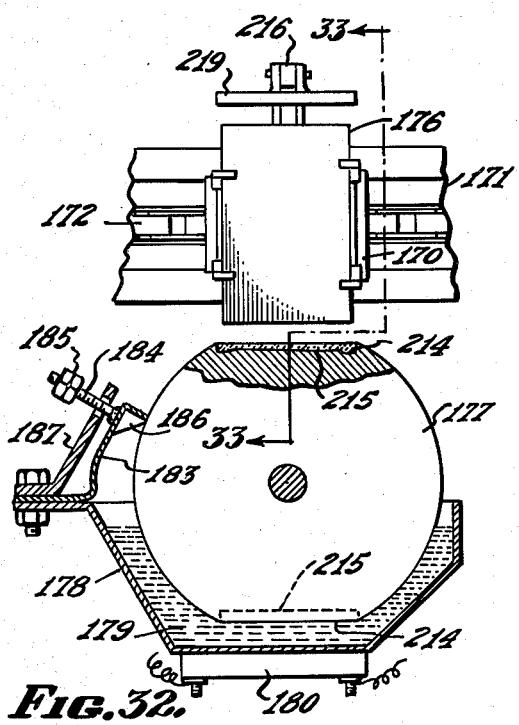
Figure 32 is a fragmentary view with parts in section of a modification of the coating mechanism of Figure 29.

Briefly, in the practice of my invention I have devised new and advantageous methods and means for applying a thermoplastic, gas-tight, coating substance to the ends of containers for the purposes described. The thermoplastic substance is in a molten or heat softened condition and is applied first to the end of the package by means of wheels or rolls, preferably flanged; and the carton may then be transferred to a molding device where the thermoplastic substance is pressed to the exact configuration desired. During the molding, the thermoplastic, gas-tight substance will be in a non-solid and adhesive condition; and my invention in one aspect contemplates the use of a cover member on the molding device which will be folded about the end of the carton over the thermoplastic coating and will be molded therewith. The end of the package may be molded without the use of a cover member on the molding device, if the molding device is first sprayed or coated with a liquid which will prevent the coating material from adhering to the mold.

The coating wheels are designed to apply coating material not only to the end of the package and to force the coating into crevices, but also to position the coating upwardly about the ends of the body walls so as to insure gas-tight union with the sleeve element. By grooving the wheels thickened areas of coating material may be formed in the area where it is needed. The coating wheels assure substantially uniform distribution of the coating substance and build up enlarged areas overlying known points of weakness where additional protection is desired. Thus the coating wheels in effect pre-form the coating substance to resemble the configuration of the molded cap. This means that the molding device need not displace large quantities of coating substance in order to secure the thickened portions of the cap since they have already been formed, and consequently, the chances of producing a defective or distorted cap are reduced to a minimum. Also, in instances the molding step may be omitted.

In Figures 1 and 2 I have shown in diagrammatic fashion, one type of mechanism suitable for end coating packages in accordance with my invention. The mechanism shown comprises the first section of a complete end capping machine. It includes mechanism for carrying the packages in continuous fashion through the entire device, as well as the coating mechanism for applying the thermoplastic coating substance to the packages as they are moved along. The machine has a frame 1, having a longitudinal guide or trackway 2 in which are slidably mounted the base plates 3 of the cages 4. An endless chain 5 travels in a recess 6 formed adjacent the trackway 2 and the base plates 3 are fastened to the chain 5 at spaced intervals. As the chain moves, the base plates slide along the trackway and move the cages through the machine. The cages, of course, carry the packages to be capped, and consequently they are provided with means for firmly gripping the packages and for releasing and ejecting them at the end of the process.

Figure 36:
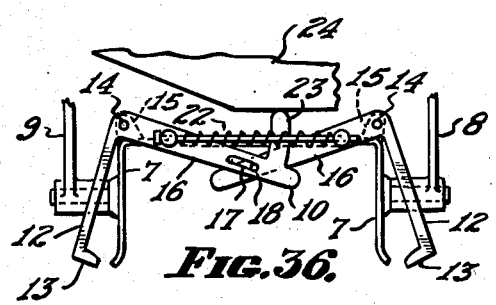
Figures 36 and 37 are respectively a plan view and a front elevational view of the cages employed in the mechanism of Figure 1.
Figure 37:
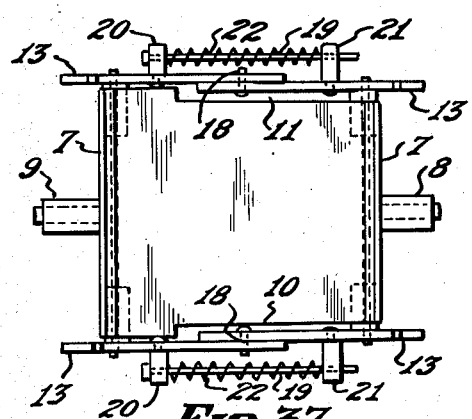

Exemplary details of the cage devices are shown in Figures 36 and 37. The cage comprises a U-shaped body member 7 pivotally mounted between the brackets 8 and 9 carried by the base plate 3. The cage can thus be swung through an angle of at least 180°. The cage assembly includes like pairs of arms carried at each end of the body member 7 and generally indicated at 10 and 11, which will grasp the package near its ends. The pairs of arms are of bell crank formation, each arm having a forwardly extending portion 12 with an inwardly bent outer end or finger 13 to engage the outer side of the package. The arms are each pivotally mounted on the body member 7 as at 14, where flanges or protuberances 15 have been provided for this purpose. Angularly related arms 16 extend rearwardly and intersect; one angularly related arm of each pair being slotted as at 17, the other arm being provided with a pin 18 for engagement with the slot 17. By the arrangement described it will be apparent that movement of the arms about their pivots 14 will occur in opposite relation, and that the arms may occupy open and closed positions relative to the body member 7.

For controlling the positions of the pairs of arms, the arms 16 are connected by a rod 19 fixed to a stud 20 carried by one of the arms and slidably mounted in a stud 21 carried by the other arm. A helical spring 22 is fixed about the rod 19 and tensioned between the studs 20 and 21. A cam following extension 23 is fixed to one of the arms 16 and will bear against the cam surface 24. When a package is inserted in the U-shaped body member 7, it contacts innermost ends of arms 16, which are in the position shown in Figure 36, and moves them outwardly so as to bring the outer ends or fingers 13 into engagement with the opposite sides of the package thereby locking the package in the cage. The rod 19 and compression spring 22 act as a dead center mechanism serving to retain the arms and fingers in the closed position. When the cam following extension 23 contacts the cam member 24 the arms 16 will be forced inwardly in opposition to the spring 22, thus causing the fingers 13 to be pivoted outwardly from the cage to permit the package to be withdrawn. The innermost ends of the arms 16 will in fact exert a kicking action and will serve to forcibly push the package from the cage. This type of cam is preferred by me; but other means for holding and moving the packages may be employed.

In Figure 2 a package 25 is illustrated as it is being inserted into the cage, the arrow indicating the direction of movement. From this illustration it can be seen that as the package is inserted it bears against the arms 16 and causes them to move past dead center. To the left of the cam following extension 23 carried on arm 16 can be seen the cam surface 24. It will be noted that the cam surface 24 terminates just short of the point where the packages are inserted into the cages, and until that point is reached, the cages cannot be closed.

Guide rails 26 and 27 in the area of the trackway 2 and adjustable guide rail 28 on the opposite side of the frame 1 serve to position the package 25 as it is placed in the cage 4. The guide rails terminate near the end of the loading station so as to free the packages for rotation, as will now be explained.

It will be noted in the embodiment of Figures 1 and 2 that the packages are inserted in the cages while in a horizontal position; but in order to apply the coating substance it will be necessary to rotate the packages to a vertical position. This may be done by means of sweep 29 adjustably mounted to the frame as at 30. The sweep 29 is configured so as to engage the top side of the package 25 near one end and turn that end downwardly. It will be remembered that the entire cage 4 is pivotally mounted between the arms 8 and 9 and therefore may be swung about its pivots. A guide bar 31 is fixed to the frame 1 as at 32 and placed so as to limit the rotation of the package. The guide bar 31 contacts the lower edge of the package and stops it in vertical position, the package being positioned between the sweep 29 on one side and the guide bar 31 on the other. These members maintain the vertical position of the package as it is moved over the coating means now to be described.

Referring to Figure 2, the coating means comprises the coating wheels 33 and 34, partially submerged in a vessel 35, containing thermoplastic sealing substance 36. A heater 37 may be employed to maintain the sealing substance in molten condition. Scraper blades 38 and 39 are positioned between the aforementioned wheels to control the quantity of coating substance carried by each wheel. As can best be seen in Figures 9 and 10, the coating wheel 33 rotates in a direction opposite to the direction of motion of the package and thus applies coating material not only to the bottom of the package but also forces some of the coating material upwardly onto the front or advancing wall of the package. The second coating wheel 34 rotates in the same direction as the direction of motion of the package. This wheel, however, rotates at a speed greater than the lineal speed of the package, thus forcing coating material into the crevices and upwardly on the trailing wall of the package. Suitable gear wheels 40 and 41 (Figure 1) are provided to drive the wheels 33 and 34 at the desired speeds. The speed of the wheels and hence the speed of the package will be determined in a large measure by the viscosity of the coating material employed.

The coating wheels 33 and 34 may be plain or either one or both may be flanged. If the wheels are plain, coating material will be applied only to the bottom to the leading and trailing walls, and to apply coating material to the side walls an additional coating step must be provided. This may be done by turning each package through a right angle about its vertical axis so as to bring the uncoated walls to the front and rear, whereupon the package may be passed over a second pair of similar coating wheels or over the same pair again, to apply coating to the remaining walls. Preferably, however, the coating wheels are provided with flanges so that coating material may be applied to the sides of the package as well as to the bottom and leading and trailing walls. The flanges are positioned to come in near contact with edge portions of the side walls contiguous the end being capped and apply coating material thereto.

In Figures 11 and 12 I have shown a coating wheel, which could be either the wheel 33 or the wheel 34. The coating surface of the wheel is at least as wide as the package being coated, and the wheel is flanged as at 42 and 43 to provide coated areas along the side edges of the package. The wheel may be additionally grooved as at 44 and 45 to provide thickened areas of coating around the bottom of the package in the areas of possible weakness.

As can be best seen in Figures 9 and 10, the coating wheels as they rotate dip into the coating in the vessel 35 and pick up quantities of coating material. The scraper blades 38 and 39 serve to control the quantity of the material carried by the wheels and allow only a controlled quantity to pass into contact with the packages.

The scraper blades 38 and 39 are adjustable by means of adjustment plates 46 and 47 shown in Figure 5, and hence the thickness of the coating may be controlled by varying the space between the scrapers and the wheels.

Immediately following the coating wheel 34 I position a wiping device indicated generally at 48. This wiping device serves to remove excess coating material extending along the sides of the package in substantially the manner illustrated in Figure 4. The coating may be somewhat irregular as initially applied and the wiper will smooth it out, and will also taper it, as shown, where desired. Too, the wiper will remove any excess coating substance and define the coated areas by neat, clean-cut lines.

The wiping device comprises a pair of resilient wiper blades 49 mounted so as to contact the sides of the packages along the edges 50. The blades have recessed portions 51 tapering outwardly as shown, and positioned to contact the coating material as at 52. The wiper blades are inclined as can be best seen in Figure 2, and may be adjusted by means of threaded adjustment rods 53 and nuts 54. Heater element 55 may be provided to heat the blades 49 and thereby soften the coating substance, thus facilitating the wiping action, as will be readily understood.

Following the wiping operation the package may be carried directly to the second or molding section of the machine, or it may be subjected to a second coating operation to apply an additional layer of coating substance. If a second coat is to be provided, a second coating station is added between the initial coating station and the molding section of the machine. In Figures 1 and 2, I have indicated in a diagrammatic fashion a portion of a second coating device, the parts of the second device being primed counterparts of the parts of the first coating device. The operation of the second device will not be described in detail, it being understood that the operation of the second device will be identical with the first. It may impose the same or a different coating material. If a second coat is applied the package will have a double thickness and coating as illustrated in Figure 6, wherein the first coat is shown at 52 and the second coat at 56. A double thickness coating finds particular utility in cases wherein a very thick deposit of coating substances is desired for molding, or where it is desired to cover an initial relatively soft coating with a layer of relatively harder substance.

The molding section of the machine comprises an elongated table 56 configured to provide a track around which a plurality of molding devices are moved in continuous fashion. The table 56 is positioned so as to permit the molding devices to move directly beneath packages carried by the cages. The movement of the molding devices will be timed so that they will move in unison with the moving packages, the molding operation being performed during the joint movement of the cages and the molding devices.

Vertical shafts 57 are journaled near each end of the table 56, as can be seen in Figure 2 of the drawings. The upper ends of these shafts carry the sprockets 58, around which pass an endless chain 59. Pinned to the chain 59 at spaced intervals are the plates 60 which slide about a trackway 61 on the table 56. The table is cut away in the area of the trackway 61 to permit parts of the molding devices—the latter being carried by the plates—to extend therethrough, as can be seen in Figure 8.

Exemplary details of the molding devices are shown in Figures 8 and 13, the former indicating successive positions of the molding devices as they move along the table. The molding means proper comprises a platform 62 spaced from the base 63, by means of studs 64, attached to the platform and slidable in perforations in the base. Spring means 65 operate to urge the platform to its highest position. The base 63 is mounted for vertical reciprocation with respect to the plates 60, by means of studs 66, attached to the bottom of the base and slidable in perforations in the plates. Each plate carries a centrally disposed stem 67 extending downwardly for contact with an inclined cam member fixed beneath the trackway 61.

The platform 62 is dimensioned so as to be slightly larger than the ends of the carton to be treated. At the ends of the platform I pivot end formers 68, and side formers 69 are similarly pivoted to the side edges of the platform. These members are designed to be swung from a horizontal position substantially co-planar with the platform to positions substantially at right angles to the platform. To produce this swinging motion automatically I mount a series of posts 70 upon the base 63. These posts, as will be clear from the figures, are of such length and so placed that the side and end formers 68 and 69 will overlie them when the base is at its lowest position, and the side and end members are substantially horizontal. As will be apparent from Figures 8 and 14, the result of raising the base will be to cause the posts 70 to raise the side and end formers to vertical position. As can be seen in Figure 8, the base is raised by the stem 67 moving up the inclined cam member 71.

Since the plates 60 of the molding devices merely slide along the trackway 61, hold down means must be provided to prevent the plates from rising from the table under the action of the stems 67. To this end hold down rails 72 and 73 are positioned to overlie the edges of the trackway 61 in the vicinity of the cam member 71. The extending edges of the hold down rails contact the upper edges of the plates and prevent them from being lifted from the trackway.

It is also desirable to provide a guide member 74 to contact the top of the package during the molding operation. This guide member not only positions the package the proper distance from the molding device, but it prevents the package from being pushed upwardly as the lower end of the package is contacted by the platform and forming members of the molding device.

Figure 13 shows the end of the carton 25 bearing a coating of sealing substance 75, about to be acted upon by the molding device. A cover member 76 will preferably be positioned on the platform prior to its association with the package. In Figure 14, the molding device is shown in closed position, with the cover member 76 molded with the thermoplastic substance 75 about the end of the package. It will be noted in Figure 13 that the central portion of the platform 62 is slightly elevated as at 78 to form a shallow area throughout the central portion of the coated end wall, with enlarged areas at the edges of the package conforming to the thickened areas preformed by the coating wheels and wipers.

Figures 15 and 16 represent two different types of end caps which may be formed. In Figure 15 the package 25 is surrounded by a gas-tight sleeve 78, the ends of the sleeve being co-terminous with the side walls of the package. The thermoplastic substance is indicated at 75 and the cover member at 76. The cover member may be made of various materials and a wide choice is permissible. I prefer a material which has gas resistance in itself, but this is not necessary. The material may be any flexible paper or other fibrous web, or a foil laminated to paper or film, or any of the non-fibrous films of commerce, and may be treated or not as desired. In Figure 17 the semi-completed package is seen capped on one end only. This illustration indicates that the sleeve may extend beyond the top of the body walls and be interfolded to form the usual tight-wrap end closure. The end caps of my invention may be formed over such folded closures. It will be understood that the package will be inverted and the other end also coated and sealed in a gas-tight fashion.

In Figure 16, the package 25 is shown without a gas-tight sleeve and with the end cap molded without a cover member. As I pointed out earlier herein, unless a cover member is used, the molding device may be first sprayed with a liquid capable of preventing the thermoplastic substance from sticking to the molding device. Referring again to Figure 1 of the drawings, a nozzle 252 controlled by a suitable valve 253 may be provided in a convenient position to spray the platform and forming members of the molding devices just before they move beneath the filled cages.

As a non-limiting example of a liquid suitable for wetting the surfaces of the molding device to prevent the coating substance from adhering thereto, I have found that glycerine mixed with water will prevent adhesion of the thermoplastic substance to the molding device. The proportions of this liquid are not critical, and only enough glycerine need be added to the water to raise the boiling point of the water sufficiently to prevent its evaporation before the completion of the molding operation. The skilled worker in the art will recognize other liquids which may be used in place of the one given by way of illustration.

After the molding device has passed the position shown in dotted lines in Figure 8, the base 63 will be forced downwardly by the action of springs 65, and the forming members, no longer under the influence of the posts 70, will resume a horizontal position, thereby freeing the end of the package. This takes place near the end of the table 56, and as the molding device starts its return movement about the trackway, the cage continues past the end of the table where the package comes under the influence of the curved sweep 79 which contacts the package near its lower, molded end and moves it through a 180° turn so as to present the opposite end for a similar coating and molding operation on a third and fourth section of the machine. If desired, however, the package may be taken from the cage immediately following the initial molding operation and passed again through the same machine or transferred to another machine.

If a third and fourth section of the machine are used, the packages will be rotated through 180° so as to present the uncoated end for contact with the coating wheel 33'', as seen to the right in Figure 8. A guide rod 80 is positioned to stop the package when it has reached the inverted vertical position, whereupon the lower guide rods 81 and 82 contact the sides of the package and position it for passage through the third and fourth sections of the machine. The third and fourth sections of the machine are identical with the first and second sections, and their construction and operation need not be described in detail.

As a non-limiting example of a thermoplastic substance suitable for coating the package ends, I give as a typical formula, which I have found very satisfactory for the purpose, the following:

35 parts paraffin having a melting point of 132° F.

40 parts "Aroclor 5460," understood to be a chlorinated terphenyl manufactured by Monsanto Chemical Company.

20 parts of a milled mixture consisting of 75 parts paraffin and 25 parts polybutene of high molecular weight.

Also, I may add 5 parts of a medium microcrystalline wax having a melting point around 165° F.

All parts are by weight. This composition is nearly colorless, has strong film-forming characteristics, forms thin but tough and gas-tight films and bonds well with all materials and parts heretofore described.

In Figures 18 and 19, I have illustrated in diagrammatic fashion mechanism suitable for simultaneously coating both ends of a package. In this embodiment the package 83 is carried in a cage 84 pinned to the moving chains 85 and 86. The package is moved between a plurality of spaced pairs of coating wheels which apply coating material simultaneously to both ends of the package. The first pair of coating wheels comprises the conical wheels 87 angularly placed with respect to the ends of the package and rotating in the direction opposite the direction of movement of the package. Small coating wheels 88 are mounted above but in near contact with the conical wheels 87 and serve to transfer coating substance from the conical wheels to the end portions of the upper wall of the package. As indicated by the arrow in Figure 18, the small coating wheels also rotate in a direction opposite to the direction of the movement of the package. The conical wheels 87 and the small coating wheels 88 serve to coat the ends and the top and bottom edge portions of the package walls, but they do not coat the end edge portions of the leading and trailing wall members.

In order to coat the end edges of the leading and trailing walls of the package, the cage is tipped through a 90° angle so as to bring the uncoated edge portions in position to be coated by the second set of coating wheels 89 and 89'. There are four of these coating wheels; two positioned above the package and designated 89' for contact with the upper edges of the package, and two positioned below and designated 89 for contact with the lower edges. Transfer wheels 90 serve to supply coating substance from a source of supply to the upper coating wheels 89'.

Exemplary details of the cage devices employed in this embodiment are shown in Figures 20 and 21. A cage device comprises a lower base plate 91 and an upper base plate 92 hingedly connected together at one end by means of the pintle 93. The lower base plate is pinned to the moving chains 85 and 86 as indicated at 94, with the hinged end of the base plates forming the leading edge of the device. The lower base plate 91 has an opening 95 cut therein through which passes an arm 96 fastened to the underside of the upper base plate 92 and extending downwardly in the channel between the chains 85 and 86.

The arm 96 is curved forwardly and carries on its free end a cam roller 97. As can be seen in Figure 19, the roller 97 will contact the cam bar 98 lying in its path, and the cam bar will cause the arm 96 to move upwardly, thereby causing the upper base plate 92 to pivot about its hinged end and assume a vertical position, thus moving the package to the position shown at the far right in Figures 18 and 19.

In order to prevent tipping of the cage device before the cam bar 98 is reached, I provide means for holding the arm 96 and the upper base plate 92 against tipping movement. The means comprises a horizontal rail 99 lying beneath the chain 85, and having an edge overlying a block 100 carried on the arm 96. As will be apparent from Figure 21, as the arm 96 advances with the cage, the block 100 will slide along the bottom edge of the rail 99, and will prevent the arm 96 from being lifted. As can be seen in Figure 19, the the rail 99 terminates just short of the cam bar 98, thereby freeing the arm for upward movement under the influence of the cam bar. The gripping mechanism of the cage devices is the same as that described in connection with Figures 36 and 37, excepting that the U-shaped body member need not be used, and I will not describe the gripping mechanism in detail, reference being to the earlier description if details are desired.

For details in the construction and arrangement of the conical wheels 87 and the transfer wheels 88, reference is made to Figure 23. As will be readily seen the parts acting on each end of the package are identical, and hence like parts will be given like reference numerals to simplify their description. The conical wheel 87 is fixed to the end of the shaft 101 by means of plate 102 and screws 103 (see Figure 25). The shaft 101 is journaled in the sleeve 104, carried by the rectangular shank 105 slidably mounted within the socket 106, the latter being fixed to the machine frame 107. The shank 105 is adjustable within the socket 106 by means of the stud 108 and lock nuts 109. A compression spring 110 surrounds the stud 109 and lies between the end of the shank 105 and the inner end of the socket 106. The compression spring 110 permits the entire assembly to recoil within the socket should the conical wheel be subjected to some unforeseen shock or pressure as caused for example by an improperly positioned package, which might become jammed against the wheel.

Beneath the conical wheel there is provided a vessel 111 containing coating substance 112. If desired, a heater 113 may be provided to maintain the coating substance in molten condition. As will be readily understood the conical wheel as it rotates, dips into the vessel 87 and carries with it some of the coating substance as it emerges from the vessel. The conical wheel is positioned so that its conical face will at one point lie parallel to and immediately adjacent the vertical end of the package 83 as the latter is moved along. Stating this differently, the conical wheel is so positioned that the package, as it moves along, will at one point, lie tangent to the conical face of the conical wheel. Thus coating substance carried on the conical face is brought into contact with the end of the package where it is deposited. As pointed out earlier, the conical wheel, in the embodiment illustrated, is rotated in a direction opposite to the direction of motion of the package, but it will be understood that the conical wheel may be rotated in the direction of movement of the package if so desired.

The lower or smaller end of the conical wheel carries the groove 114 and the outwardly extending flange or lip 115, the latter serving to contact the bottom edge portion of the package. The lip 115 is not parallel to the package 83 at their point of contact, but tapers away, and forms with groove 114, a thickened area of coating material at the edge of the package.

The small coating wheel 88, which contacts the end edge of the top wall of the package, is fed a supply of coating substance by the groove 116 and the inwardly tapering surface 117, on the larger end of the conical wheel 87. The small coating wheel 88 is fixed on the end of the shaft 118 journaled in the sleeve 119 mounted to an overhead frame member 120 by means of bracket 121 and bolts 122. A compression spring 123 is fitted about the shaft 118 between the transfer wheel and the sleeve 119, and permits the small coating wheel and the shaft to be moved axially should the wheel be subjected to abnormal pressure. The position of the small coating wheel relative to the edge of the package is controlled by the lock nuts 124. As can be seen clearly in Figure 23, the small coating wheel 88 is inclined slightly with respect to the top of the package so as to form a tapered area of coating material. In Figures 18 and 19, it can be seen that the small coating wheel is positioned off center with respect to the uppermost edge of the conical wheel 87. This causes the coating material to be transferred to the small coating wheel as a tapered mass thereby facilitating its application to the package in a tapered condition.

Scraper means are provided on both the conical wheel and the small coating wheel to control the quantity of coating substance carried to the package. These scrapers are, of course, adjustable to vary the thickness of the coating. In Figure 25, I have shown a scraper suitable for use with the conical wheel 87. It comprises an angular blade 125 having an extension 126 adjustably mounted to an arm 127 depending from the sleeve 104. The blade is positioned so as to scrape the conical surface of the wheel 87, and is adjustable by means of slots 128 and screws 129. Smaller scraper blades 130 and 131 are adjustably attached to the blade 125; with the blade 130 serving to scrape the flange 115, and the blade 131 serving to scrape the tapering surface 117. A scraper 134 is adjustably attached to the small coating wheel 88. The blade portion 135 is tapered so as to be closer to the wheel near the edge thereof, and thus provides a tapered deposit of coating material for application to the package.

If desired, a heating coil 132 (Figure 25) may be provided in the conical wheel to heat that element. Electrical current may be supplied to the heating coil by means of brushes 133 (Figure 23), as will be understood.

The shaft 101 of the conical wheel may be driven by a flexible cable 136, as may the shaft 118 of the small coating wheels 88. It will be understood, however, that other drive means, such as gears and the like, may be employed.

In Figure 26, I have illustrated the package 83 as it appears after having passed between the coating wheels just described. It will be noted that the bottom 137 and the top and bottom edges 138 and 139 respectively have been coated in the manner indicated. The ends of the opposite pair of walls, however, remain uncoated as does the end edges of the bottom panel where thickened areas are to be provided.

In Figure 24 I have shown means for coating the areas left uncoated by the coating wheels just described. It will be remembered from the description of Figure 18 that the cages, after passing the conical wheels 88, are tipped through a 90° angle to bring the packages to an upright position with the uncoated edges to the top and bottom. The uncoated edges are then acted upon by the flanged coating wheels 89 and 89'.

Again, the parts acting on each end of the packages are identical, and like parts will be given like reference numerals. Referring first to the lower pair of coating wheels, it will be seen that the flanged coating wheel 89 is fixed to the end of a shaft 140 journaled in a sleeve 141 carried by the shank 142 fitted in a socket 143. The socket 143 is carried by a bracket 144 mounted to the machine frame 107 by means of bolts 145. A compression spring 146 may be provided to absorb shock and permit the wheel to recoil under undue pressure. A vessel 147 containing coating material 148 is placed beneath the lower end of the flanged wheel 89, and a heating element 149 may be provided to maintain the coating substance in molten condition. A heating device 150 of suitable construction may be employed to maintain the wheel 89 in heated condition.

In Figure 22 I have shown a scraper suitable for use with the flanged wheel 89. It comprises a blade 151 adjustably attached to an arm 152 depending from the sleeve 141. The scraping edge of the blade 151 is configured to conform substantially to the configuration of the flanged wheel 89, and an additional scraper blade 153 may be provided, substantially as shown. It will be noted that the triangular portion 154 of the scraper blade 151 enters the flanged portion of the wheel 89 and is configured to allow more coating substance to remain in the apex of the flange than at the outer edges. Thus again a tapered effect is obtained when the coating is applied to the package.

The upper coating wheels are similar to the lower ones, as are the means by which they are mounted. Therefore, parts of the upper coating wheels corresponding to the parts of the lower wheels have been given like but primed reference numerals.

With the upper coating wheel 89' means must be provided to transfer the coating substance from the vessel 148' to the wheel, for it will be apparent that the wheel cannot be passed through the coating substance as in the case of the lower wheel 89. To this end, I provide a transfer wheel 90 fastened to the shaft 155 journaled in the sleeve 156. The sleeve 156 is mounted to the bracket 157 carried by the machine frame. A compression spring 158 may be provided between the transfer wheel and the sleeve to serve as a shock absorber. From Figure 24 it will be apparent that the transfer wheel is angularly related to the flanged coating wheel and suitably configured as at 90a so as to deposit a supply of coating substance on the periphery of the flanged wheel.

The coating wheels 89 and 89' are driven by means of the driven shaft 159, turning in the direction indicated by the arrows. The shaft 159 rotates the radial tooth gear 160, which meshes with the bevel gear 161 carried by the shaft 140' of the upper coating wheel 89'. Hence the wheel 89 is caused to rotate. Near the end of the shaft 159 the miter gears 162 serve to rotate the shaft 163 as indicated. The shaft 163 carries a bevel gear 164 meshing with a spur gear 165 carried on the end of the shaft 155 of the transfer wheels 90. At the lower end of the shaft 163, the miter gears 166 serve to rotate the shaft 167. The shaft 167 in turn carries a bevel gear 168 which meshes with a spur gear 169 carried by the shaft 140 of the lower coating wheel 89. The various gears and shafts just described are rotated in the directions indicated by arrows, and hence movement is imparted to all of the coating wheels, as well as the transfer wheels. As will be evident, by judicious selection of suitable sized gears, the speed of rotation of the various wheels may be controlled as desired. Furthermore it will be understood that the driving mechanism just described, in modified form, could be used in place of the flexible cable drive illustrated in connection with the conical wheels.

In Figure 27 I have illustrated the package 83, which is the same package as shown in Figure 26, after it has been acted upon by the coating wheels 89 and 89'. In addition to the coated area 137 and the thickened portions 138 and 139, the package now has end edges coated at 170 and 171. With the method of end coating just described, a molding operation is not required and need not be performed unless desired, since the package end will not only be completely coated as it emerges from the coating mechanism, but the coating will be distributed in the manner found most advantageous. It is not, however, without the spirit of my invention to employ a molding device following the application of the coating, should a cover member be desired, or should extra precautions be necessary to insure a particularly tight package.

In Figures 28 and 29, I have shown an alternative coating and sealing device of simplified construction. The device illustrated is characterized by a single coating wheel or roller and a single molding device, the packages pausing in their travel to be acted upon by the latter. The cages 170 are similar to those described in connection with the preceding mechanisms, and are moved along the trackway 171 by means of the endless chain 172, passing around the sprockets 173 and 174 positioned near each end of the machine. A table or platform 175 underlies the cages at one end of the machine and serves to position the packages 176 for insertion into the cages.

Mounted to the frame of the machine below the path of travel of the cages, is the coating rollers 177, mounted for rotation in a clockwise direction. The usual vessel 178 containing coating substance 179 lies beneath the coating roller 177 so as to contact the bottom or lower portion thereof. The coating roller 177 is provided with one or more recessed portions 180 formed in the cylindrical face of the roller and corresponding in size substantially to the end of the package 176. The recesses are of substantially uniform depth throughout but may be configured to provide thickened areas of coating substance, as will be understood. As the coating roller 177 rotates, a quantity of the coating substance 179 is picked up by the recess 180 and carried upwardly into contact with the bottom of the moving package. The rotation of the roller must be timed to conform to the movement of the package so that the leading edge of the package will be properly positioned at the leading end of the recess 180 as the latter enters the path of travel of the bottom of the package.

As the package and roller each continue their respective movement, the bottom of the package and the recess portion will be brought in contact throughout their lengths, and hence the coating substance carried by the recessed portion will be transferred to the package end and caused to coat contiguous end portions of the body walls. As before, a heating element 181 may be provided to retain the coating substance in molten condition.

In order to control the quantity and distribution of the coating substance carried in the recessed portion 180, and to otherwise free the roller of coating substance, I provide a pair of rigid scrapers 182, and I may also provide a resilient scraper 183, the first mentioned scraper serving to remove coating substance from the cylindrical surfaces lying to the outside of the recessed portion 180, and the latter, a resilient scraper serving to free the areas between the recessed portion from coating substance as well as to control the thickness and the distribution of the coating substance carried in the recessed portions themselves. As seen in Figure 30, the scrapers 182 contact the outer edges of the roller 177 and scrape them clean. The scrapers 182 may be permanently attached to a cross piece carried by the coating vessel. The resilient scraper 183 is of substantially the same width as the recessed portion 180 and biased to normally lie within the said recessed portion by means of the threaded stud 184, the arm 185 through which the stud passes and the lock nuts 186. As can be seen in Figure 29, the resilient scraper has a reversely bent leg 187 near each side thereof to remove the scraper from the recessed portion 180. The legs 186 will contact the trailing edge of the recessed portions and will ride over them causing the scraper to move outwardly for contact with the cylindrical surface of the roller. When the next recessed portion is encountered the resilient scraper blade will enter it, being limited however, by the lock nuts bearing against the arm 185.

From the coating roller the package moves to the stationary molding device 188, where it pauses long enough to be subjected to the molding operation. An overhead guide bar 189 serves to position the package for action by the molding device.

The molding device is similar to those already described, and comprises a base 190 having a platform 191 spaced from it, by means of studs 192, attached to the platform and slidable in perforations in the base. Spring means 193 urge the platform to its highest position. A plurality of posts 194 underlie the end formers 195 and the side formers 195a. The base 190 is carried by the vertical columns 196 slidable in the bearings 197. A compression spring 198 urges the connector bar 199, attached to the lower ends of the vertical columns 196, to its lowermost position, thereby causing the base 190 to assume its lowermost position. The underside of the connector bar 199 carries a cam roller 200 for contact with the eccentric cam wheel 201. As will be apparent from the drawing, as the cam wheel 201 passes through one complete revolution it will cause the base of the molding device to be raised and lowered, thereby molding the end of the package.

To secure the proper timed movement of the package, the coating roller, and the molding device, I provide the gear box 202 containing gear or clutch mechanism suitable to provide selective movement of the shafts 203 and 204. Numerous arrangements of gears and/or clutches may be provided to give the desired movement, and since these arrangements will be well known to those skilled in the art, I will not describe them in detail. As shown, the miter gears 205 serve to rotate the sprocket 173 and move the chain 172. At the far end of the shaft 203, a gear wheel 206 meshes with a gear wheel 207 carried on the shaft 208 to drive the coating roller. A pair of miter gears 209 serve to translate motion from the shaft 208 to the roller 177. As will be evident from the drawings, the shaft 204 drives the eccentric cam wheel 201 through the miter gears 210. The gear box 202 may be driven from driving means indicated at 211.

After the molding operation, the cage passes the inclined cam surfaces 212 positioned to contact the cam following extension 213 carried by the cage. When the cam following extension 213 contacts the cam surface 212 the arms of the cage will be moved past dead center and spring to the open position, the package being expelled or at least freed for removal from the cage.

Figures 32 to 35 illustrate a modification of the device just described in which the cages are stopped above a coating roller which is also held stationary, the packages being pushed downwardly, bodily, into contact with the coating substance. Since this embodiment is a modification of the device shown in Figures 28 and 29, like parts have been given like reference numerals.

In this embodiment the coating roller 177 has flattened portions 214 configured to form recessed portions 215 conforming substantially to the end of the package. Since the recessed portions are flat and do not follow the curvature of the roller, the roller will be stopped and the package moved downwardly into the recessed portion while it is stationary. The packages are moved downwardly by means of a lever arm 216 pivoted at 217 to the machine frame. A spring 218 urges the free end of the lever to its highest position. The free end of the lever carries a pivoted plate 219 for contact with the top of the package. The lever is activated by means of the plunger 220 and the eccentric cam wheel 221. The lower end of the plunger 220 carries a cam roller 222 which rides over the surface of the cam wheel 221. A spring 223 urges the cam roller 222 into contact with the cam wheel 221.

Figure 33:
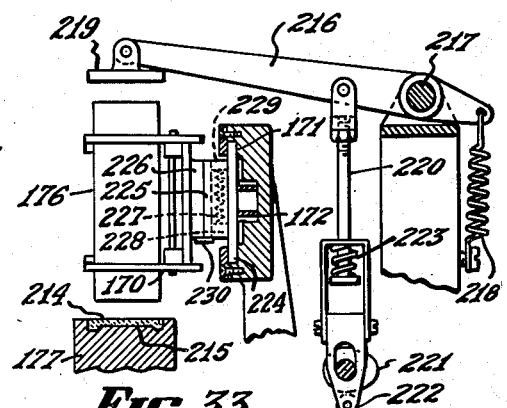
Figure 33 is a sectional view taken along the line 33—33 of Figure 32.
Figures 34, 35:
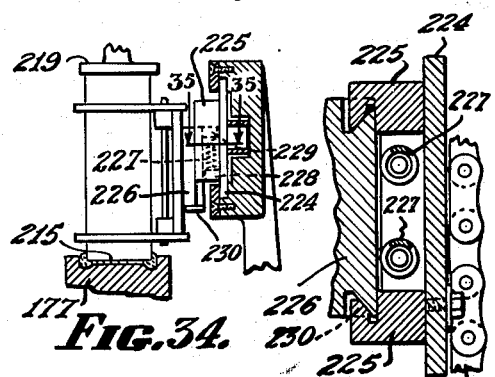
Figure 34 is a view similar to Figure 33 but showing the package in contact with the coating composition.
Figure 35 is an enlarged sectional view taken along the line 35—35 of Figure 34.

To cause the package to move downwardly under influence of the lever 216 and the plate 219, the base of the cage is provided with the dove-tail construction illustrated in Figures 33, 34 and 35. The base 224 of the cage slides in the trackway 171 and carries the channeled member 225 into which is slidably fitted the member 226, the latter dove-tailing into the former. Compression springs 227 are fitted between an abutment 228 on the lower end of the channeled member 225 and an abutment 229 carried on the upper end of the member 226. The cage 170 is connected to the member 226.

In operation, as the lever 216 causes the plate 219 to bear against the top of the package, the cage will move downwardly, the member 226 sliding with respect to the member 225 and against the tension of the springs 227. The package is thereby brought into contact with the coating roller 177. As the cam wheel 221 finishes its revolution the lever 216 will return to the lifted position under the influence of spring 218, and the member 226 will be urged upwardly by the springs 227. An abutment or stop 230 may be provided at the bottom edge of member 226 for contact with the bottom of member 225 to limit the upward movement of the cage.

In Figures 38 through 40 I have shown a molding device particularly suited to the molding of packages to be provided with cover members. Referring to Figures 38 and 39, I have shown a platform 231 to which are hinged the side formers 232 and end formers 233. The side and end formers are hinged to the platform by means of the pintles 234 and 235 respectively. Springs 236, wound about the pintles, serve to bias the side and end formers to the horizontal position. In addition to hinging the side formers 232 to the platform 231, the pintles 234 also pivotally mount the spring fingers 237 to the ends of the side formers. As will become apparent hereinafter, these spring fingers serve to interfold the corner portions of the cover sheets applied to the end of a package over the thermoplastic coating substance. Spring 238, attached to the bottom of the platform 231 by screws 238a, are connected to a rearwardly extending portion of the spring fingers 237 and bias them outwardly to a substantially horizontal position where the stops 239 prevent further movement.

The platform 231 is supported above the base 240 by the springs 241 surrounding the studs 242 fixed to the platform and extending through perforations in the base. A series of posts 243 are mounted on the base 240 and so placed that the side and end formers 232 and 233 will overlie them when the platform is at its uppermost position. Extending upwardly from each corner of the base are the vertical columns 244. These columns extend upwardly to substantially the level of the platform, and are adjustable by means of their threaded lower ends and the nuts 245. Each column carries near its top a horizontally extending latch 246 for contact with the rear edges of the spring fingers 237. Details of the latch 246 are shown in Figure 47. The latch is pivoted to the notched upper end of the column by means of a pin 247, and a spring 248 biases the finger to the horizontal position. The column 244 serves as a stop and prevents the finger from moving downwardly past the horizontal position, although it may be moved upwardly to a substantially vertical position against the tension of the spring 248.

In Figure 39, I have indicated by broken lines a package 249 and a cover member 250, showing their relationship to each other and to the molding device. In the particular molding device shown, the side and end formers are closed by depressing the platform. It will be understood, however, that the device may be constructed so as to close the side and end formers by elevating the base 240 in the manner described in connection with Figures 8, 13 and 14.

Successive positions of the side and end formers and the spring fingers during the depression of the platform are illustrated in Figures 40 through 45. In Figures 41 and 42, the platform is shown in partially depressed condition, with the side formers 232 in upturned condition and the spring finger moved upwardly and just out of contact with the cover member 250. The spring finger 237 is urged upward by the latch 246 over which the rear, curved surface of the spring finger rides. As seen in Figure 42, the end former 233 has not yet contacted the post 243 and hence is still in horizontal position. The cover member 250 can be seen extending beyond the end of the side former 232.

In Figures 43 and 44, a more advanced stage in the depression of the platform is shown. The spring finger 237 has been moved by the latch 246 inwardly and the corner portion of the cover member folded in bellows-wise fashion about the end of the package. As seen in Figure 44, the end former 233 has begun its upward movement, but has not yet reached the vertical position.

Figure 40 shows the molding device in completely closed condition. The spring fingers 237 have passed the latches 246 and have returned to the horizontal position under the influence of the springs 238. As will be evident, the spring fingers pass the latches 246 and are released prior to the complete closing of the end former 233; otherwise the spring fingers would be caught between the end formers and the package.

As will be evident from Figures 45 and 46 the function of the spring fingers is to fold the corner portion of the cover member 250 bellows-wise over the end of the package so that the corner portion will be folded and sealed between the package and the end of the cover member. As seen in Figure 46, the cover member may be formed with openings 251 at the corner portions to permit the passage of coating substance therethrough when the corner portions are folded to the position shown in solid lines. The sealing substance will be forced through the holes and hence seal the several thicknesses of the corner portion to each other.

Modifications may be made in my invention without departing from the spirit of it.

Having described my invention in several exemplary embodiments, what I claim as new and desire to secure by Letters Patent is:

1. In a device for forming sealing caps on the ends of closed packages, a conveyor for moving said packages in a path of travel with an end of each package exposed for treatment, roll coating apparatus for applying thermoplastic sealing substance to the exposed end of each package and to end edge portions of the body walls of the package lying parallel to the direction of movement thereof, and wiping blades lying beyond said coating apparatus for contact with the body walls of the package to which sealing substance has been applied, said wiping blades being shaped to form the thermoplastic sealing substance into predetermined configuration and to remove excess sealing material from said walls.

2. The device claimed in claim 1 wherein said wiping blades include heating elements to heat the blades and thereby soften the sealing substance.

3. In a device for forming sealing caps on the ends of packages for the purposes described, a conveyor for moving packages in a path of travel with an end of each package exposed for treatment, and a roll-coating apparatus acting to apply to said end a coating of thermoplastic substance and extensions of said coating on end portions of opposite walls of each package contiguous said end, said roll-coating apparatus including two coating rolls, one roll turning in the direction opposite the direction of movement of said package to deposit coating upon the leading wall end portion, and the other roll turning in the direction of movement of said package and at a peripheral speed greater than the lineal speed of said package whereby to coat the trailing wall end portion.

4. In a device for forming sealing caps on the ends of packages for the purpose described, a conveyor for moving packages in a path of travel with an end of each package exposed for treatment, roll-coating apparatus acting to apply to said end a coating of thermoplastic and an extension of said coating on an end portion of a wall of each package contiguous said end, a molding device beyond said coating apparatus for receiving the coated end of each package and molding said coating about the end of each package, said molding device being movable from an open to a closed position, and means for actuating said molding device after a package has been received, said actuating means acting in timed relationship with said conveyor.

5. In a device for forming sealing caps on the ends of packages for the purpose described, a conveyor for moving packages in a path of travel with an end of each package exposed for treatment, roll-coating apparatus acting to apply to said end a coating of thermoplastic and an extension of said coating on an end portion of a wall of each package contiguous said end, a molding device beyond said coating apparatus for receiving the coated end of each package and molding said coating about the end of each package, said molding comprising a platform corresponding to the end of said package and forming members hingedly connected to the edges of said platform and adapted to be folded relative to said platform when said device is actuated, and means for actuating said molding device after a package has been received, said actuating means acting in timed relationship with said conveyor.

6. In a device for forming sealing caps on the ends of packages for the purpose described, a conveyor for moving packages in a path of travel with an end of each package exposed for treatment, roll-coating apparatus acting to apply to said end a coating of thermoplastic and an extension of said coating on an end portion of a wall of each package contiguous said end, molding apparatus beyond said coating apparatus for receiving the coated end of each package and molding said coating about the end of each package, said molding apparatus comprising a plurality of molding devices traveling in a path of travel paralleling in part at least the path of travel of said packages and moving in timed relation therewith, and means for actuating each of said molded devices after a package has been received, said actuating means acting in timed relationship with said conveyor.

7. In a device for forming sealing caps on the ends of packages for the purpose described, a conveyor for moving packages in a path of travel with an end of each package exposed for treatment, roll-coating apparatus acting to apply to said end a coating of thermoplastic and an extension of said coating on an end portion of a wall of each package contiguous said end, molding apparatus beyond said coating apparatus for receiving the coated end of each package and molding said coating about the end of each package, said molding apparatus comprising a plurality of molding devices traveling in a path paralleling in part the path of said packages and in timed relation therewith, whereby each molding device moves jointly with a moving package during their parallel travel and cam means for activating the molding devices during their joint movement with said packages so as to perform a molding operation on said packages.

8. In a device for forming sealing caps on the ends of packages, a conveyor for moving the packages in a path of travel with an end of each package exposed for treatment, roll-coating apparatus acting to apply to said exposed end a coating of thermoplastic substance and an extention of said coating on an end portion of a wall of each package contiguous said end, said conveyor comprising cage devices having means for gripping and releasing said packages, said cage devices each having a base, supporting arms fixed to said base, and a body element pivotally mounted between the supporting arms, whereby a package carried by said device may be moved about an axis paralleling the path of travel of the conveyor, and sweep means for engaging the packages to cause them to be moved about the said axis.

9. The device claimed in claim 8 including stop means for halting the movement of the packages in predetermined position.

10. In a device for forming sealing caps on the ends of packages for the purposes described, a conveyor for moving packages in a path of travel with at least one end of each package exposed for treatment, and roll-coating apparatus acting to apply to said end a coating of thermoplastic substance and an extension of said coating on an end portion of a wall of each package contiguous said end, said roll-coating apparatus including a roll having a conical body portion and a flange, the axis of said conical roll being angularly related to the axis of said package, with the conical body of said roll at one point lying substantially parallel to the end of said package and a second coating roll angularly related to the first, for depositing an extension of said coating on the wall opposite the first mentioned wall.

11. In a device for forming sealing caps on the ends of packages for the purposes described, a conveyor for moving packages in a path of travel with at least one end of each package exposed for treatment, and roll-coating apparatus acting to apply to said end a coating of thermoplastic substance and an extension of said coating on an end portion of a wall of each package contiguous said end, said roll-coating apparatus including a roll having a conical body portion and a flange, the axis of said conical roll being angularly related to the axis of said package, with the conical body of said roll at one point lying substantially parallel to the end of said package, a second coating roll angularly related to the first, for depositing an extension of said coating on the wall opposite the first mentioned wall, actuating means for turning said package axially so as to bring the other walls of said package contiguous said end in position for near contact with additional coating rolls for depositing extensions of said coating on said other walls.

12. In a device for forming sealing caps on the ends of packages for the purposes described, a conveyor for moving packages in a path of travel with at least one end of each package exposed for treatment, and roll-coating apparatus acting to apply to said end a coating of thermoplastic substance and an extension of said coating on an end portion of a wall of each package contiguous said end, said roll-coating apparatus including a roll having a conical body portion and a flange, the axis of said conical roll being angularly related to the axis of said package, with the conical body of said roll at one point lying substantially parallel to the end of said package, a second coating roll angularly related to the first, for depositing an extension of said coating on the wall opposite the first mentioned wall, actuating means for turning said package axially so as to bring the other walls of said package contiguous said end in position for near contact with additional coating rolls for depositing extensions of said coating on said other walls, said additional rolls comprising a pair of flanged rolls angularly related to the axis of said package.

13. In a device for forming sealing caps on the ends of packages for the purposes described, a conveyor for moving packages in a path of travel with at least one end of each package exposed for treatment, and roll-coating apparatus acting to apply to said end a coating of thermoplastic substance and an extension of said coating on an end portion of a wall of each package contiguous said end, said roll-coating apparatus including a roll having a conical body portion and a flange, the axis of said conical roll being angularly related to the axis of said package, with the conical body of said roll at one point lying substantially parallel to the end of said package, a second coating roll angularly related to the first, for depositing an extension of said coating on the wall opposite the first mentioned wall, actuating means for turning said package axially so as to bring the other walls of said package contiguous said end in position for near contact with additional coating rolls for depositing extensions of said coating on said other walls, said additional rolls comprising a pair of flanged rolls angularly related to the axis of said package, and a transfer roll for transmitting coating substance from a source of supply to at least one of said additional rolls.

14. In a device for forming sealing caps on the ends of packages for the purpose described, a conveyor for moving packages in a path of travel with the ends of each package exposed for treatment, and a roll coating apparatus acting to apply to said ends a coating of thermoplastic substance and extensions of said coating on end portions of a wall of said package, said roll-coating apparatus comprising a pair of spaced rolls each having a conical body and a flange, the axis of each roll being angularly related to the axes of said packages, and with the conical body of each roll at one point lying substantially parallel to an end of said package, means for turning said packages axially so as to bring the other walls of said packages in position for near contact with spaced pairs of flanged coating rolls for depositing extensions of said coating on said other walls.

15. In a device for forming sealing caps on the ends of packages for the purpose described, a conveyor for moving packages in a path of travel with the ends of each package exposed for treatment, and a roll coating apparatus acting to apply to said ends a coating of thermoplastic substance and extensions of said coating on end portions of a wall of said package, said roll coating apparatus comprising a pair of spaced rolls each having a conical body and a flange, the axis of each roll being angularly related to the axis of said packages, and with the conical body of each roll at one point lying substantially parallel to an end of said package, means for turning said packages axially so as to bring the other walls of said packages in position for near contact with spaced pairs of flanged coating rolls for depositing extensions of said coating on said other walls, and transfer rolls for carrying coating substance from a source of supply to at least one of the flanged rolls of each pair.

16. In a device for forming sealing caps on the ends of packages for the purposes described, a conveyor for moving packages in a path of travel with at least one end of each package exposed for treatment, and roll-coating apparatus acting to apply to said end a coating of thermoplastic substance and an extension of said coating on an end portion of a wall of each package contiguous said end, said roll-coating apparatus including a roll having a conical body portion and a flange, and said conveyor comprising cage devices, each of said devices capable of being tilted on an axis transverse the path of said conveyor, whereby packages carried by said cage devices may be tilted axially through an angle of substantially 90°.

17. In a device for forming sealing caps on the ends of packages, a conveyor for moving the packages in a path of travel with an end of each package exposed for treatment, roll-coating apparatus acting to apply to said exposed ends a coating of thermoplastic substance and extensions of the coating on end portions of the walls of said packages contiguous said coated ends, said roll-coating apparatus comprising a coating roll having at least one recessed portion formed in the peripheral surface thereof intermediate the side edges of the roll, said recessed portion conforming substantially to the exposed ends of the packages being coated, molding apparatus beyond said coating apparatus and in the path of travel of said conveyor for receiving the coated end of each package and molding the coating about the end edges of the package, said conveyor, said coating apparatus and said molding apparatus operating in timed relation with respect to each other.

18. The device claimed in claim 17 wherein said molding apparatus comprises a plurality of molding units traveling with the conveyor in time relationship therewith, and wherein said coating apparatus, said conveyor and said molding apparatus are in continuous movement.

19. In a device for forming sealing caps on the ends of packages for the purpose described, a conveyor for moving packages in a path of travel with an end of each package exposed for treatment, and a roll-coating apparatus acting to apply to said end a coating of thermoplastic substance and extensions of said coating on end portions of the walls of each package contiguous said end, said roll-coating apparatus comprising a roll having at least one recessed portion therein conforming substantially to the exposed end of said package, molding apparatus for molding said coating about the exposed end of said packages, said molding apparatus comprising a molding device lying in the path of travel of said packages beyond said coating roll, means for causing said packages to halt in their path of travel in position to be acted upon by said molding device, means for activating said molding device when said packages are halted.

20. In a device for forming sealing caps on the ends of packages for the purpose described, a conveyor for moving packages in a path with an end of each package exposed for treatment, and a roll-coating apparatus acting to apply to said end a coating of thermoplastic substance and extensions of said coating on end portions of the walls of each package contiguous said end, said roll-coating apparatus comprising a roll having, at least one recessed portion therein conforming substantially to the exposed end of said package in combination with molding apparatus for molding said coating about the exposed end of said packages, said molding apparatus comprising a molding device lying in the path of said packages, and operating means for causing said packages to halt in their path of travel immediately adjacent said molding device and for activating said molding device whereby each of said packages may be acted upon by said molding device, said operating means including mechanism for rotating said roll in timed relation to the movement of said packages.

21. In a process of end capping packages, the steps of providing a package having enclosing side and end walls, moving said package in a path of travel with an end wall thereof exposed for treatment, applying thermoplastic substance to the exposed end of said package and to adjacent end edges of said side walls, molding said thermoplastic substance about the end of said package, rotating said package through an angle of substantially 180°, applying thermoplastic coating substance to the opposite end of said package in the same fashion, and subjecting said last mentioned end to a molding operation.

22. In a process of end capping packages, the steps of moving a package in a path of travel with at least one end thereof exposed for treatment, said exposed end lying in a plane substantially parallel to the direction of movement of the package, applying thermoplastic coating substance to the exposed end of the package and to contiguous end edge portions of an opposite pair of side walls of said package, rotating said package about an axis of rotation lying at right angles to the direction of motion of the package through substantially a right angle, and thereafter applying thermoplastic coating substance to the end edge portion of the remaining pair of opposite side walls.

23. The process of claim 22 wherein said thermoplastic coating substance is formed in thickened areas about the lateral edges of said package ends.

SAMUEL BERGSTEIN.

REFERENCES CITED

The following references are of record in the file of this patent:

UNITED STATES PATENTS

| Number | Name | Date |
|---|---|---|
| 816,438 | Davis | Mar. 27, 1906 |
| 831,230 | Latimer | Sept. 18, 1906 |
| 840,822 | Calkins | Jan. 8, 1907 |
| 1,023,569 | Juengst | Apr. 16, 1912 |
| 1,033,265 | Pachter | July 23, 1912 |
| 1,277,939 | Juengst | Sept. 3, 1918 |
| 1,346,799 | Juengst | July 13, 1920 |
| 1,495,433 | Peebles | May 27, 1924 |
| 1,662,341 | Schwarz | Mar. 13, 1928 |
| 1,671,079 | McManus | May 22, 1928 |
| 1,847,557 | Gerderes | Mar. 1, 1932 |
| 1,855,207 | Steinmann | Apr. 26, 1932 |
| 1,859,652 | Bullerjahn | May 24, 1932 |
| 1,895,617 | Fay | Jan. 31, 1933 |
| 1,965,130 | Reinhardt | July 3, 1934 |
| 2,012,905 | Chace | Aug. 27, 1935 |
| 2,082,186 | Staude | June 1, 1937 |
| 2,128,827 | Killian | Aug. 30, 1938 |
| 2,165,210 | Baldwin | July 11, 1939 |
| 2,181,332 | Kronquest | Nov. 28, 1939 |
| 2,185,089 | Kronquest | Dec. 26, 1939 |

(References on following page)

UNITED STATES PATENTS

| Number | Name | Date |
|---|---|---|
| 2,203,072 | Albright | June 4, 1940 |
| 2,217,336 | Eden | Oct. 8, 1940 |
| 2,298,913 | Arden et al. | Oct. 13, 1942 |
| 2,338,524 | McCabe | Jan. 4, 1944 |
| 2,388,042 | Daily | Oct. 30, 1945 |
| 2,402,548 | Guyer | June 25, 1946 |
| 2,485,372 | Farrell | Oct. 18, 1949 |
| 2,485,373 | Farrell | Oct. 18, 1949 |
| 2,490,299 | Hennessey | Dec. 6, 1949 |
| 2,510,463 | Danziger | June 6, 1950 |
| 2,510,464 | Danziger | June 6, 1950 |